Figure 1:
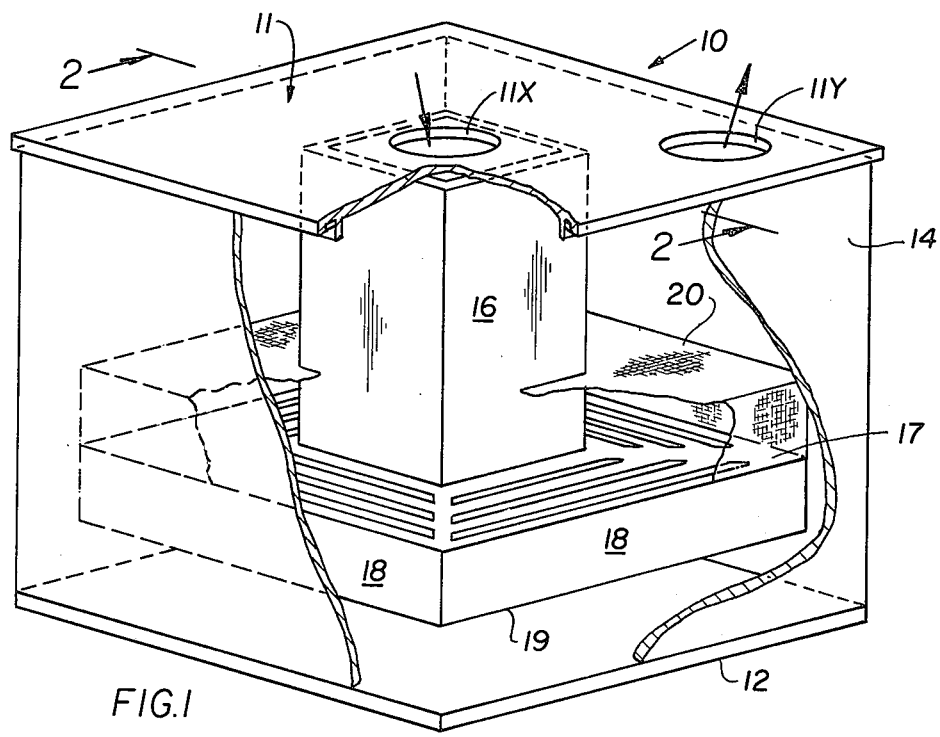

United States Patent [19]
Coppola

[11] 3,957,466
[45] May 18, 1976

[54] GAS WASHING DEVICE
[76] Inventor: John J. Coppola, 1054 59th St., Brooklyn, N.Y. 11219
[22] Filed: Mar. 8, 1974
[21] Appl. No.: 449,440

[52] U.S. Cl. .................................. 55/256; 261/122
[51] Int. Cl.² ........................................ B01D 47/02
[58] Field of Search ..................... 55/252, 255, 256; 261/122

[56] References Cited
UNITED STATES PATENTS

| | | | |
|---|---|---|---|
| 1,018,996 | 2/1912 | Swett | 55/255 X |
| 1,051,957 | 2/1913 | Jacobs et al. | 55/255 |
| 2,167,839 | 8/1939 | Henderson et al. | 55/255 X |
| 2,405,494 | 8/1946 | Dupuy | 55/252 |
| 2,787,454 | 4/1957 | Coppola | 261/122 |
| 3,331,194 | 7/1967 | Reed et al. | 55/256 X |
| 3,608,280 | 9/1971 | Martin | 55/255 X |

Primary Examiner—Bernard Nozick

[57] ABSTRACT

An improved gas washing device wherein gases to be cleaned are passed into the device through the gas inlet. A tubular connection between the gas inlet and a bell chambers which is provided with a top slotted plate. Wire mesh disposed over the bell chamber. An aqueous detergent solution in the device wherein the bell chamber and the wire mesh are submerged in the solution, A gas outlet in the top of the device spaced from the gas inlet. A number of the devices may be connected in series.

1 Claim, 4 Drawing Figures

U.S. Patent    May 18, 1976    3,957,466

GAS WASHING DEVICE

This invention relates to an improved gas washing device and preferably to a self-cleaning automated device having a plurality of cells in series and of enlarged cleaning area. This invention is an improvement over this inventor's device of U.S. Pat. No. 2,787,454 of Apr. 2, 1957.

According to this invention, an enlarged gas cleaning area of more efficient operation is provided by the provision of a bell-type gas chamber within each cell. The gas chamber is made with a top plate having a centrally disposed inlet aperture for introducing the obnoxious gas and smoke particles into the bell- or-volume chamber. This top plate is provided with a plurality of suitably disposed slots of suitable pre-disposed width located about this inlet aperture. Preferably the slots are of an elongated configuration, but perforations of different configurations are operable. A depending intergal non-perforated skirt is provided to the peripheral edge of the top plate to entrap the said gas and is of a suitable height to prevent escape of gas below the skirt's free edge.

In this invention a suitable angular basket screen is disposed upon the top plate to completely cover the said slots in order to trap the finer particles that pass through said slots. Thus this invention provides a dual-action removal of all particles of all sizes. Therefore, this invention has a primary removal of the larger particles, a secondary removal of fine particles and a tertiary removal of soluble obnoxious gases by solution of chemically reactive gases with acidic or basic aqueous detergent solution disposed in the cells to a suitable height over said basket screen.

This invention is illustrated by a single embodiment thereof, shown in the accompanying drawing but it is not to be limited to this illustration for it is of a generic scope. Thus, for example, the bell skirt may be cylindrical in place of the rectangular skirt shown, and other obvious modifications fall within the embrace of this disclosure.

Figure 2:
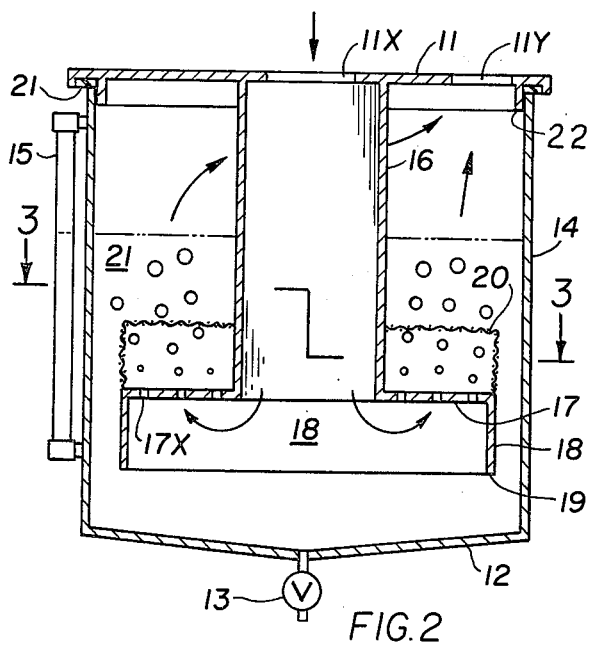
Figure 3:
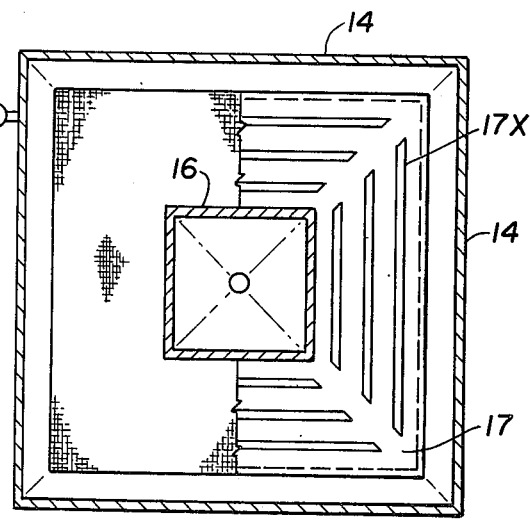
Figure 4:
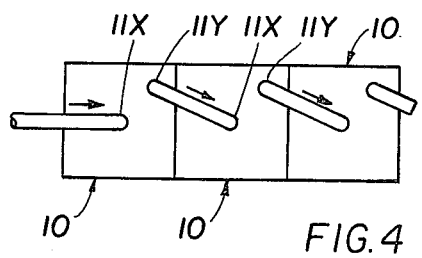

FIG. 1 is a perspective view of a single cell, showing by means of gas flow arrows the incoming polluted gas and the exit of cleaned gas, FIG. 2 is a section view taken on line 2—2 of FIG. 1 and showing by arrows the internal gas flow pattern within the cell and showing further the manner of sludge removal from a conical base plate that converges the sludge toward the cone center due to the turbulent action of the incoming gas on the solution within the cell and the force of gravity, FIG. 3 is is a view taken on line 3—3 of FIG. 2 and showing the large area used for particle capture and FIG. 4 is a top plan view of a battery of cells interconnected by suitable conduits in series relationship.

As shown in FIG. 1, the cell 10 is provided with a removable cover plate 11 and a conical base plate 12 having a clean-out valve 13 at the apex. The cell 10 comprises lateral wall 14 to which a conventional sight glass 15 is secured to indicate the liquid detergent level within the cell of the detergent solution. The cell cover plate is provided with a central inlet opening 11X and a cleaned gas exit opening 11Y. A tube 16 is hermetically sealed about the opening 11X of the cover plate 11 and to the top plate 17 of the bell chamber for conducting the polluted gas to this chamber. Plate 17 is provided with suitably sized slots or perforations suitably disposed therein for maximum entrapment of the larger particles and is preferably, but optionally, spaced away from the cell lateral wall 14. A skirt non-perforated wall 18 is made integral with the long perpherial edge of plate 17 and in depending relationship thereto. Preferably, the bottom edge 19 of skirt wall 18 does not engage the base plate 12, but where a hermetic engagement is effected, such cells are also operable.

FIG. 4 shows the manner of cleaning gas using a battery of cells 10. Such cells may be made to remove soluble gases and particles in a graduated manner, so that one cell may contain a caustic or base solution of pH greater than 7 whereas another cell may contain a cleaning solution in the acid range of less than pH 7 to remove ammonia or basic gases. Also the solvent solutions may be organic solvent such as acetone, benzene, etc. to remove specific pollutant gases such as hydrocarbons.

In the operation of this invention, the polutted gas with particles therein is introduced centrally into the cell by means of tube 16 and the gases are cleaned mechanically and chemically in each cell simutaneously and the removed exteriorally of tube 16, to a second cell if desired, or to the atmosphere if suitably cleaned in one cell.

This invention may be automated so that the sludge may be removed at timed intervals by operation of valve 13.

Preferably, the cover plate 11 integral with tube 16 and bell chamber components are removed as a unit, as necessary to clean them and the wire mesh basket 20 of suitable mesh thereon. Preferably, the wire is made of stainless steel or suitable plastic and is slidably disposed onto the top plate 17 of the bell chamber, for separate removal and cleaning its small openings.

During operation of this device, the large particles such as carbon particles are wetted by the detergent solution and fall to the base 12 due to gravitation action, so that the slots 17X are self-cleaning. Smaller particles, if any, are trapped in the mesh basket.

In the illustrated device herein, the removable cover 11 is provided at its periphery with a continuous hermetic rubber gasket 21 and also with a plurality of guide posts 22 to correctly seat the gasket to the top edge of lateral wall 14. The weight of the cover plate 11 is usually sufficient to effect a hermetic seal under the light gas pressure used to motivate the gas through the device, which gas pressure may be aided by the use of suction, if needed.

I claim:

1. A gas washing device comprising an open top gas impervious container having side walls and a conical bottom wall with a cleanout valve at the apex of said bottom wall, a removable top cover plate, a continuous rubber gasket positioned between said cover plate and the top of said side walls, said gasket providing a hermetic seal at the junction of said cover plate and said side walls, said cover plate having an inlet aperature for polluted gas and an outlet aperature for a cleaned gas, tubular means depending downwardly from and hermetically sealed to said cover plate around said inlet aperature, bell chamber means hermetically secured to the bottom edge of said tubular means, said bell chamber means having a horizontally disposed top slotted plated connected to said tubular means, imperforate side walls connected to and depending downwardly from said top slotted plate, wire mesh means disposed upon and over said top slotted plate and surrounding and connected to said tubular means, the aperatures of said wire mesh means being smaller than the slots of said top slotted plate, said wire mesh means extending radially outwardly from said tubular means the same distance as said top slotted plate, said bell chamber means and said wire mesh means being spaced from the side walls of said container, an aqueous detergent solution disposed in said container, the level of said solution being above the weir mesh means so that the wire mesh means and the bell chamber means are submerged in said solution, whereby when polluted gases are passed into said inlet aperature they pass downwardly through said tubular means and diffuse outwardly into said solution in said bell chamber means, they then pass upwardly through said top slotted plate, said wire mesh means and out said outlet aperature.

* * * * *